UNITED STATES PATENT OFFICE.

EMIL VON PORTHEIM, OF SMICHEW, AUSTRIA.

PROCESS OF MANUFACTURING AN INSPISSATING AND SIZING PASTE FROM ANIMAL PROTEINE.

SPECIFICATION forming part of Letters Patent No. 243,178, dated June 21, 1881.

Application filed May 13, 1881. (No specimens.)

*To all whom it may concern:*

Be it known that I, EMIL VON PORTHEIM, of the city of Smichew, in the Empire of Austria, have invented an Improved Process of Manufacturing an Inspissating and Sizing Paste from Animal Proteine, of which the following is a specification.

This invention has reference to an improved process of manufacturing an inspissating and sizing paste from animal proteinous substances, to be employed as a substitute for starch, dextrine, gum, &c., and other sizings in the manufacture of paper, printing of textile fabrics, and the like.

The invention consists of an improved process of manufacturing an inspissating and sizing paste from extracts of animal proteinous substances treated with caustic alkalies.

In following out my improved process one thousand grams of dry proteinous substances such as meat or meat-scraps, caseine or fibrine, are heated in a water-bath for eighteen hours with ten liters of water and fifty-four grams of caustic soda. The solution obtained thereby is passed through a sieve and tested, and if the same is not perfectly neutral it is neutralized by continued stirring with diluted acetic or muriatic acid as long as the same is still warm. The liquid paste so obtained can be employed either directly, like starch, or it can be dried by being spread at a temperature of 25° to 30° centigrade on sheet-zinc or porcelain trays. The dried product remains perfectly soluble, but it is necessary to observe in dissolving it the same care which is necessary in dissolving albumen obtained from animal blood. In place of the caustic soda caustic potash can also be used.

The application of the paste obtained by the process described has not only the advantage of a lower price and a better drying capacity, but it imparts, also, the same body, adhesion, and elasticity as the materials which have been heretofore employed for the same purpose. When used as a sizing it gives a considerably-improved appearance to the fabrics. Analogous to starch, it cannot be applied with acid dyes.

When the paste is employed in connection with the salts of lime, barytes, alumina, zinc, and the soluble salts of the heavy metals it is necessary, for preventing coagulation of the same, to add such salts which, according to the rules of analytical chemistry, are known to retard or prevent the precipitation of these salts by means of bibasic acids or their soluble salts. In place of the salts referred to such salts which are commonly employed in calico-printing, as soluble resist-pastes under albumen colors, can also be used.

The application of the inspissating and sizing paste obtained from animal proteine by my improved process is exactly the same as that of starch, gum, &c., it being capable of advantageous use for inspissating and sizing purposes in calico-printing, for the sizing of paper in the manufacture of wall-papers, also for the glazing of paper, in book-binding, in the dyeing of leather, and in similar applications.

Having thus described my invention, I claim as new and desire to secure by Letters Patent—

1. The process herein described of manufacturing an inspissating and sizing paste for use in the arts by treating extracts of animal proteinous substances with caustic alkalies, substantially as set forth.

2. As a new article of manufacture, an inspissating and sizing paste obtained from animal proteinous substances, substantially as described.

In testimony whereof I have signed my name to this specification in the presence of two subscribing witnesses.

EMIL V. PORTHEIM.

Witnesses:
CARL FEHLERT,
BERTHOLD ROI.